March 15, 1938.　　　J. W. GALYON　　　2,110,858
STATISTICAL CARD MACHINE
Filed Sept. 18, 1934　　　4 Sheets-Sheet 1

INVENTOR.
John W. Galyon
BY
ATTORNEY.

March 15, 1938. J. W. GALYON 2,110,858
STATISTICAL CARD MACHINE
Filed Sept. 18, 1934 4 Sheets-Sheet 2

INVENTOR.
John W. Galyon
BY
ATTORNEY.

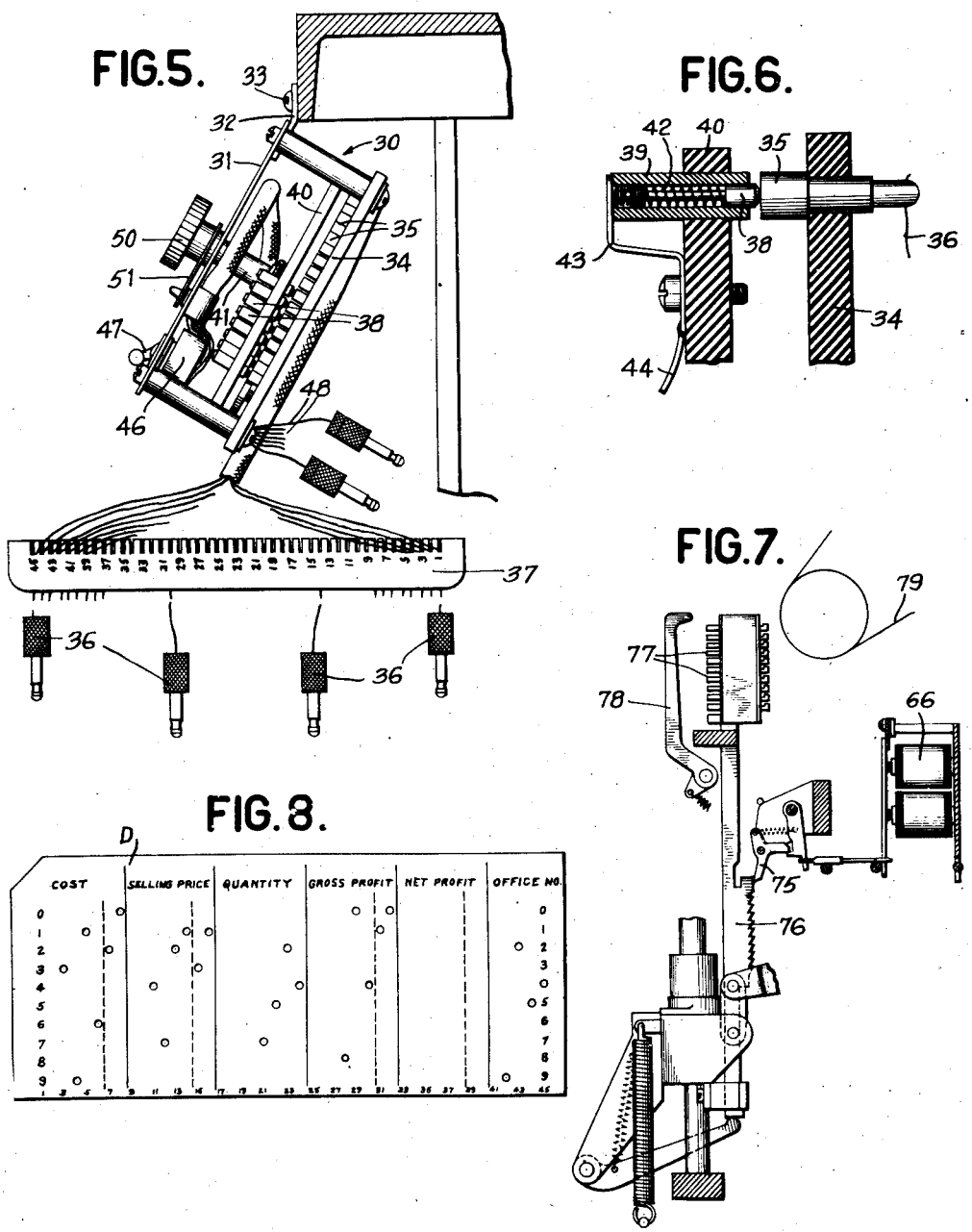

Patented Mar. 15, 1938

2,110,858

UNITED STATES PATENT OFFICE 2,110,858

STATISTICAL CARD MACHINE

John W. Galyon, Springfield, Ill., assignor to International Business Machines Corporation, New York, N. Y., a corporation of New York Application September 18, 1934, Serial No. 744,525

2 Claims. (Cl. 235—61.6)

This case relates to improvements in tabulating machines in which perforated record cards control mechanism to perform bookkeeping operations.

The perforations in the record cards represent various data in accordance with their positions in card columns and as fixed by a selected code. The cards are run through the machine which includes an analyzer for reading or sensing the card perforations and controlling the accounting mechanism in accordance with the analysis. The analyzer includes, in some types of machine, a gang of pins arranged in columns, each column of pins correlated to and sensing a corresponding card column. In other types, the analyzer includes a row of brushes extending transversely of the line of travel of the card, each brush of said row being correlated to and sensing a different card column.

In either type, the analyzing elements may perform their analysis by protruding through the card perforations to close circuits which govern machine operations. The control cards, as a rule contain forty-five or eighty columns. To tabulate information, the machine usually contains three to seven banks of accumulators and type bars. In some cases, certain card columns are required to control operation of a certain bank of such accounting elements. In other cases, the same columns are to control a different bank of elements. In still other cases, the same columns are to control two or more banks of elements. For these reasons, it is desirable to provide flexibility of control connections between the card analyzer and the banks of accounting elements. Accordingly, it has been customary to provide plug connections between the brushes and the accounting elements.

By setting the plug connections variously in the selected plug sockets, any desired card columns may be associated with any set of accounting elements. Further, plug connections are usually provided for automatic control according to group classifications, for listing of the group classification, and so on.

Where a machine is controlled by group classifications, usually an upper card analyzer similar in structure to the lower card analyzer is provided. The upper analyzer also contains a sensing brush for each card column but as a rule the lower analyzer alone controls the operation of accounting elements to tabulate the information on the cards.

The difficulty with the plugging means for the selection of control connections between the card analyzer and the accounting devices is that there are so many individual wires to be set and so many different arrangements to govern the setting of the wires, that unless the operator is extremely skilled and experienced in the operation of the machine, mistakes will be made and these occur even with the most skilled operators. Further, aside from the possible errors which may occur, the plugging procedure occupies too much time and entails too concentrated an effort.

Accordingly, objects of the present invention are to provide means for simplifying the connections between the analyzer brushes and accounting elements, to eliminate errors in variably associating the columns to the accounting elements, to perform the various selections with a minimum of time, and to indicate clearly, in a manner requiring no special skill, the operations required to associate the desired columns with the desired accounting elements.

Another object is to provide such improved selecting means as an attachment to an existing machine to convert the latter from a plugboard type to a quickly settable multi-contact type.

Other objects will appear from the following description and from the drawings.

Fig. 5 is a section along line 5—5 of Fig. 1.

Fig. 6 is a section on line 6—6 of Fig. 3 showing details of the contacts of a column selector.

Fig. 7 is a view of a printing unit controlled by the machine through the selector unit.

Fig. 8 shows a typical tabulating card, and

The invention will be explained in connection with the tabulator disclosed in Patent No. 1,822,594 although, as will appear, the invention is of more extended application in the tabulating art.

Figure 1:
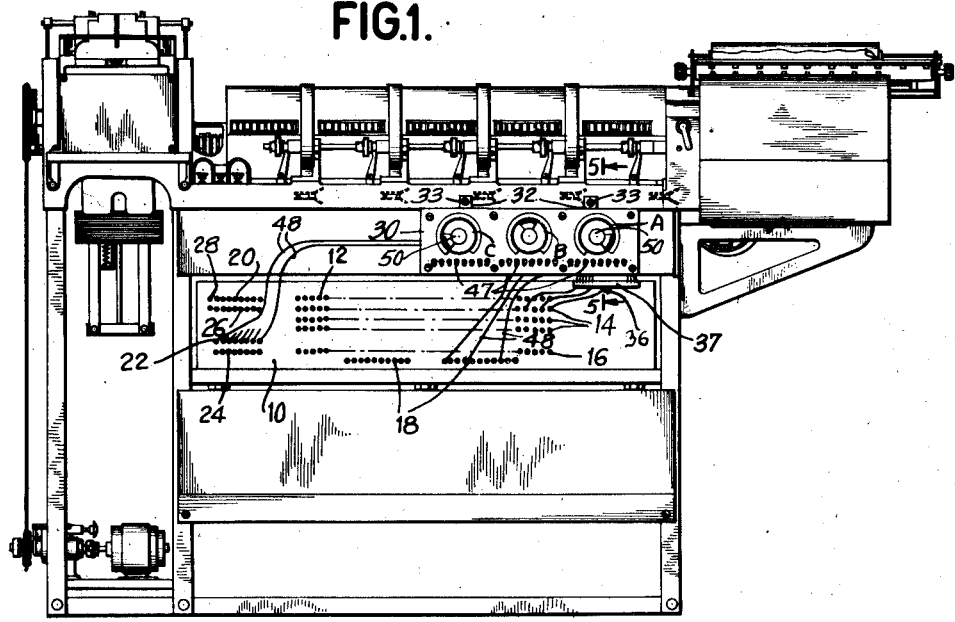
Fig. 1 is a front view of a tabulating machine to which the attachment is applied.
Figure 2:
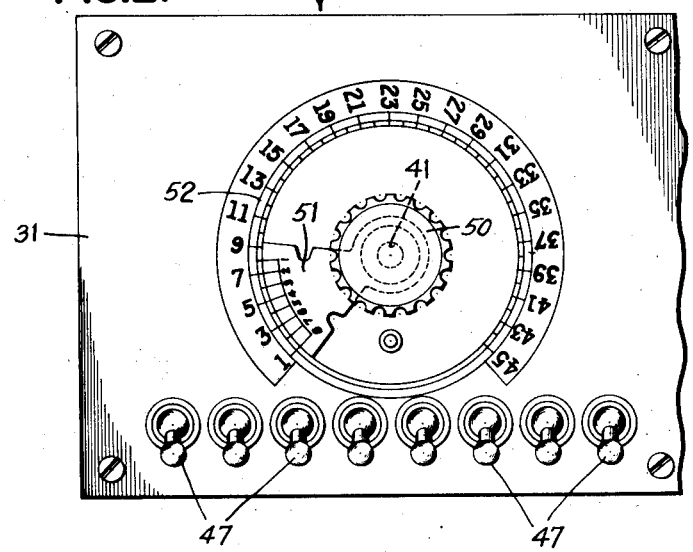
Fig. 2 is a front view of a column selector unit of the attachment.
Figure 3:
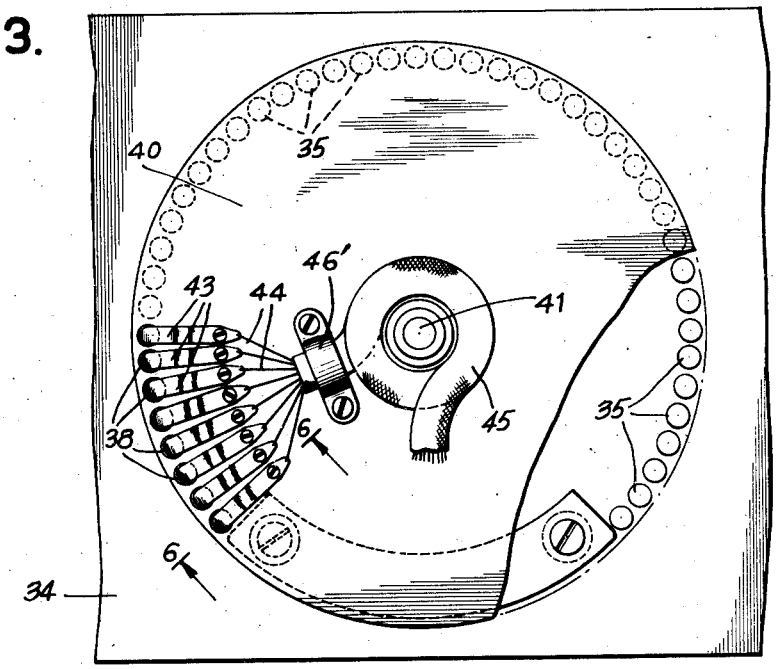
Fig. 3 is a front detail view of a column selector unit with the front plate of the attachment removed.
Figure 4:
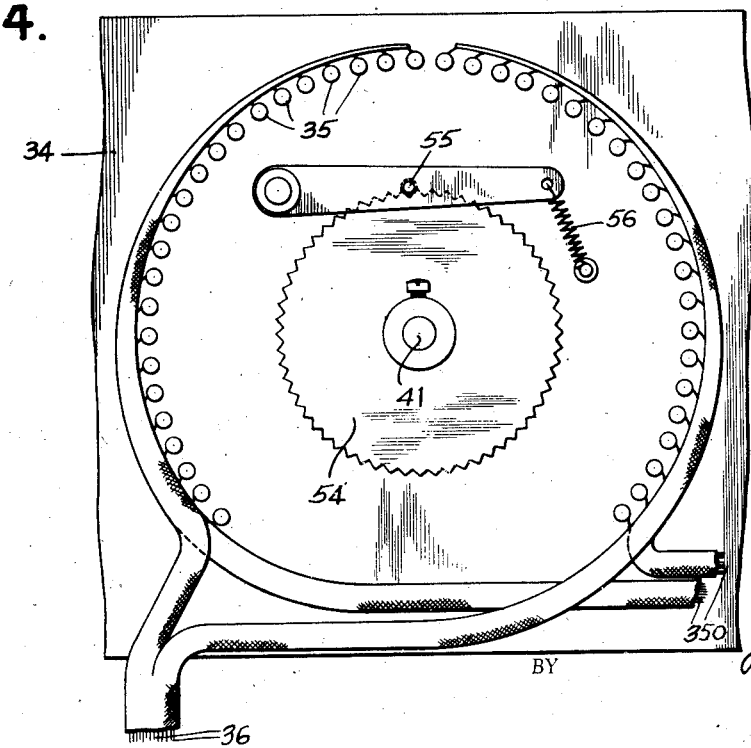
Fig. 4 is a rear view of a selector unit.

Referring to Fig. 1, the machine has a plugboard 10 with several rows of sockets. Sockets 12 connect to the upper card reading brushes; sockets 14 to the lower analyzing brushes; sockets 16 to the item counting and printing controls; sockets 18 to purely printing controls; sockets 20 to one side of automatic group control mechanism for changing machine operation according to group classification; sockets 22 to the opposite side of the group control mechanism; sockets 24 correspond to sockets 690 of Fig. 31 of Patent 1,822,594, referred to above, and are plugged, when desired, to sockets 16 for causing the group control item of the card to be indicated and listed or to sockets 18 when group listing without indicating is desired and sockets 26 may be selectively plug-connected to socket 28 for cutting out a portion of the group control mechanism; all as disclosed in the aforementioned patent.

Without the present attachment, typical selections are made as follows:

1. To select certain card columns to automatically control the machine, plug connections are made from those sockets 12 corresponding to the selected columns to sockets 20.

2. To complete above control selection, plug connections are made between sockets 14 and 22.

3. To complete said selection of machine control with group indication and printing, plug connections are made as in paragraph numbered 2, above, and additional plug connections are made between sockets 16 and 24.

4. To select columns for controlling item registering or printing and adding elements, plug connections are run between sockets 14 and 16.

5. To select columns for controlling merely the printing of items, plug connections are made between sockets 14 and 18.

6. To omit automatic machine control by certain of the devices connected to sockets 20, a plug connection is made between special socket 28 and one of sockets 26.

Each time a different inter-association of card columns to the various devices is desired, the plug connections must be individually and painstakingly readjusted and varied.

By utilizing the present invention the labor, time, and skill required in effecting the various adjustments noted above is largely eliminated.

As an illustration of the application of the invention, it will be described only in detail in connection with the lower analyzer brushes for performing the results noted in paragraphs numbered 2 and 5, above.

It will be clear, however, that the results noted in the other numbered paragraphs may be obtained in a similar manner.

Referring to Figs. 1 and 5, the present attachment comprises a box casing 30 the front wall 31 of which has bent lugs 32 engaging the machine frame and secured by screws 33 to the frame, preferably above plugboard 10. In this manner, the attachment is carried by the machine frame at an angle thereto inclining downwardly and outwardly, thereby leaving a space between the rear wall 34 of the box casing and the front of the machine for the various connecting wires to pass downwardly to plugboard 10.

For illustration, the attachment is shown with three rotary column selectors or distributors A, B and C, although a greater or less number may be used, as desired. Each selector has forty-five circumferentially arranged contact studs 35 secured to and passing through the rear wall 34 of casing 30 so as to project on opposite sides of the rear wall. On the outer side of the rear wall, studs 35 of selector A are each soldered to a plug connection 36. The studs 35 of selector A are connected by suitable leads 350 to the corresponding studs 35 of selector B and the studs of the latter are similarly connected to the studs 35 of selector A. Thus, corresponding studs 35 of the selectors are connected in parallel to a common plug wire 36. These plug connections first extend downwardly in cable form and then spread apart in a single row passing through a bar 37. The bar is inscribed opposite each connection 36 with the number of the column to which the connection corresponds. Guided by the indications on bar 37, the connections 36 are preliminarily plugged to the correspondingly numbered sockets 14 of plugboard 10. Thus, corresponding studs 35 of the selectors are connected to the same plug socket 14 and each such stud corresponds to the card column denoted by the plug socket.

The contact studs 35 of each selector, at the inner side of the rear wall 34 are selectively engaged by eight contact pins 38. These pins are slidably carried by small brass tubes 39 imbedded in a Bakelite disk 40 which is fixed to a shaft 41 journaled in the front and rear walls of casing 30.

Springs 42 inside tubes 39 constantly press pins 38 into firm engagement with contact studs 35. The outer ends of the eight tubes 39 are engaged by leaf spring terminals 43 of eight wires 44 which are gathered in a cable 45 secured by bracket 46' to the front of Bakelite disk 40 and wound around shaft 41. The ends of wires 44 opposite terminals 43 individually lead into eight snap switches 46 arranged in a single horizontal row and secured to the front wall 31. Projecting exteriorly of the front wall are the finger levers 47 for opening or closing switches 46. Leading out of the switches 46 are eight plug wires 48. According to the present example, the plug wires 48 leading out from selector A are plugged into one group of eight sockets 18 of plugboard 10 and the plug wires from selector B are plugged into the next group of eight sockets 18. Each such group of sockets 18 is connected to a separate bank of devices (magnets 66) for controlling a bank of multi-denominational order item manifesting members (printers 76), to manifest a multi-denominational value, as will be brought out hereinafter in connection with the circuit diagram, Fig. 9.

Figure 9:
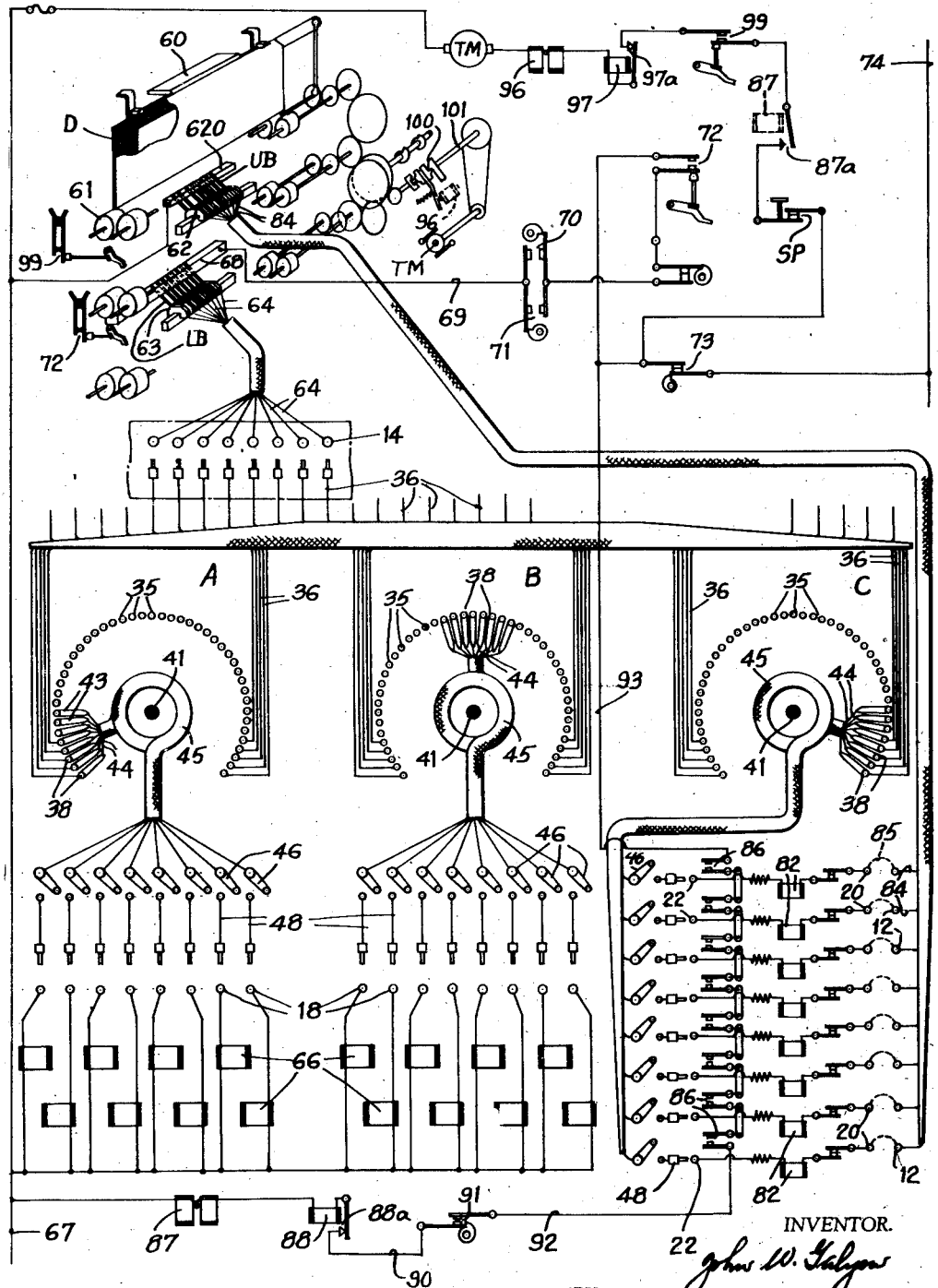
Fig. 9 is a circuit diagram illustrative of the invention.

The plug wires 48 from selector C are plugged into the group of eight sockets 22 which are connected to a bank of automatic machine control devices (magnets 82, Fig. 9).

Shaft 41 of each selector has fixed thereto in front of casing 30, a hand knob 50 and an index plate 51 with indications 1 to 8, reading counter-clockwise. Each latter indication corresponds to a plug connection 48.

Concentrically disposed about each shaft 41, the front of casing 30 is inscribed with a column indicating chart comprising a graduated row 52 of indications 1 to 45, reading clockwise. Each such indication corresponds to a different card column and a different plug wire 36.

By rotating shaft 41 to a selected position, any group of eight successive card columns may be connected to the eight successive plug wires 48. Thus, if card columns 1 to 8 are to be connected to the plug wires 48, the shaft 41 is rotated until number 8 on the index plate 51 is in line with number 1 of the graduated row 52. In this position, the eight pins 38 connected to plug wires 48 are engaging the first eight contact studs 35 connected to the plug wires 36. Also since the unit order card column of a group is the one furthest to the right, which in the selected example is number 8, the units order plug wire 48 or number 1 should coact with this column. For this reason, the numbers on the index plate 51 run oppositely to the numbers of the graduated row 52.

Any of the columns selected may be dissociated from a plug wire 48 by opening the switch 46 from which the wire 48 leads out.

Each shaft 41 carries outside the rear wall 34 of the casing a toothed disk 54 with which an impositive holding pawl 55 coacts. The pawl is pivoted to wall 34 and held in engagement with disk 54 by a spring 56 to thereby impositively retain the shaft 41 in any position to which it has been rotated.

The manner in which the above mechanism coacts with the accounting mechanism will now be explained with reference to the circuit diagram, Fig. 9.

Cards D are fed one at a time from a supply magazine 60. The issuing card is fed by feed rolls 61 successively through upper and lower analyzers.

A row of forty-five perforation sensing or card analyzing elements or devices 62, insulated from each other, is provided in the upper analyzer, one device for each card column, and a corresponding row of perforation sensing devices 63 in the lower analyzer. A sensing device of one row is in the same line in the direction of travel of the cards as a corresponding sensing device in the other row so that these alined devices will sense the same card column. Lower sensing devices 63 are connected to wires 64 which lead to plug sockets 14 in plugboard 10. Plugged into sockets 14 are the forty-five plug wires 36 common to selectors A, B, and C. Leading out from selectors A and B are plug wires 48 which are plugged into sockets 18 of the plugboard. Wired to sockets 18 are banks of magnets 66 connected to one side 67 of the current supply. When a sensing device 63 encounters a perforation in its card column, it engages a wire brush LB carried by a common conductor 68 and a circuit is formed as follows:

From one side 67 of the current supply, through magnet 66 to plug socket 18, through plug connection 48 to switch 46, through wire 44, contact pin 38, the stud 35 engaged thereby, plug wire 36, socket 14, wire 64, device 63, a brush LB, conductor 68, wire 69, either of the cam contacts 70 or 71 whichever is closed, card lever contacts 72, and through closed cam contacts 73 to the opposite side 74 of the current supply.

Energization of magnet 66 thereupon occurs to release a latch pawl 75 (Fig. 7) which engages the cyclically movable type carrier 76 and stops it in a differential position. The carrier 76 slidably carries a series of type bars 77 and when the carrier is stopped in a differential position, the type bar 77 corresponding to the value of the perforation sensed by the card sensing device 63 is located in printing position.

At the end of the cycle, a hammer 78 strikes type bar 77 to print or register the value of the perforation on a record sheet 79. Details of the printing or item registering mechanism may be obtained from aforementioned Patent No. 1,822,594.

When a change in card group occurs, the operation of the machine is automatically varied and various operations occur such as total taking and resetting. The control of the machine upon a group change is effected by deenergization of magnets 82 (Fig. 9) when group perforations in the upper and lower cards do not agree. There is one magnet 82 for each group control column of the card. One side of the magnet leads to one of the plug sockets 20 in series with eight selected upper card devices 62 sensing the selected group control columns of the upper cards. The other side of the magnet 82 leads to one of the sockets 22 into which are inserted the eight plug wires 48 leading out from selector C. The indicator 51 of the latter is adjusted so that the contact pins 38 are engaged with studs 35 which correspond to the group control columns. The plug wires 36 extending from selector C are connected to the lower card devices 63. When there is no change in group classification of the cards, alined card sensing devices 62 and 63, respectively of the upper and lower analyzers, simultaneously sense perforations in each group control card column and form a circuit as follows:

From line 67 through the common conductor 62a, the upper wire brush UB carried by said conductor, the upper sensing device 62 engaging the brush UB through the perforation in a group control column, wire 84 connected to the brush, plug socket 12, a suitable connection 85 to plug socket 20, magnet 82, plug socket 22, plug wire 48 of the selector C, through the selector to a plug wire 36 thereof, a socket 14, wire 64, live lower sensing device 63, the brush LB engaging with the latter device through a perforation, conductor 68, and in the same manner as in the previously described circuit to the line 74 of the current supply.

If the card group does not change, then during the card reading cycle, the upper and lower analyzers will feel identical perforations in each group control column of the successive cards and by the end of the card cycle will have energized each magnet 82 to close all the serially connected contacts 86 which are latched in position until near the end of the card cycle. With these contacts closed, a relay 88 maintained energized during the card reading period in a manner disclosed in Patent No. 1,822,594 remains energized after the card reading period by the following circuit:

From line 67 through a motor control relay magnet 87 (at bottom of Fig. 9), a relay 88, previously closed armature contacts 88a of relay 88, line 90, cam contacts 91 (closed after the card analyzing period), line 92, serially through closed contacts 86, through line 93, and through cam contacts 73 to line 74.

Motor control relay 87 when energized keeps contacts 87a in the following motor circuit closed:

From line 67, through motor TM (at top of Fig. 9), clutch magnet 96, relay 97, previously closed armature contacts 97a, upper card lever contacts 99, relay contacts 87a, stop key contacts SP, and through cam contacts 73 to line 74.

Clutch magnet 96 holds clutch 100 (Fig. 9) engaged with a driving shaft 101 operated by motor TM. The driving shaft actuates the card feed picker 60 and feed rolls 61.

When any one of the contacts 86 fails to close during a card cycle because of a change in group data, of the successive cards, the circuit through contacts 86 cannot be made and motor control relay 87 is deenergized, causing contacts 87a to open and break the circuit through motor TM and clutch magnet 96. Consequently, the feed of cards D is interrupted.

To summarize, by merely rotating knob 50 of a selector to set its index plate 51 so that its indications 1 to 8 aline with desired numbers on graduated row 52 of the selector, the card columns corresponding to said numbers of the row 52 are selected for control functions. Thus, any of the card columns may be selectively connected through selector A to the accounting control devices comprising printing control magnets 66 of one bank of printing means; any of the card columns may be selectively connected to the second bank of printing means through selector B; and any of the columns may be selected for connection to the accounting control devices comprising the banks of group control magnets 82. Further, if the same column is to be connected to two different banks of printers as is sometimes desired (see Patent No. 1,950,475), this can easily be done by setting the indications of indexes 51 of selectors A and B in alinement with the same numbers on graduated rows 52 of the selectors.

If any of the columns are to be cut out of control, the switch 46 is opened. Thus, if only five column figures are to be printed, then the last three switches 46, from the left, of a selector are opened, thereby cutting out the three higher orders of printing elements. If an intermediate card column of a selected group of columns is to be cut out of control an intermediate switch 46 is opened.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In an accounting machine for handling record cards having columns of value designations and including card analyzing devices, each for analyzing one card column for designations and a bank of multi-denominational order accounting devices; the combination of a plurality of contact elements corresponding to the card columns and connected to the card analyzing devices, a series of contact members having a denominational order relationship and each order member being operatively connected to the corresponding order of said bank of accounting devices, said members being commonly and selectively settable into engagement with a corresponding series of any successive ones of said elements of the same number as the members to thereby connect the members with the corresponding series of card columns, a common carrier for said members, means mounting the carrier for adjustment to jointly shift the series of members into engagement with any desired series of elements, a column indicating scale having column indicating numbers progressively increasing in one direction, an index having numbers corresponding to the orders of said members and progressively increasing in a direction opposite to aforesaid, said index being operated by adjustment of the carrier to indicate on the scale the columns selected by the members, and circuits closed through the members and selected elements upon the card analyzing devices sensing designations in the selected card columns for controlling operation of the orders of the bank of accounting devices according to the analysis of the values of the selected series of columns.

2. In an accounting machine for handling record cards having columns of item designations and including a plurality of card analyzing devices each for analyzing one of the card columns for designations and a bank of accounting control devices; the combination of a plurality of elements connected to the card analyzing devices and corresponding to the different card columns, a number of members connected to the control devices of the aforesaid bank and selectively settable as a unit into coaction with a corresponding number of any successive ones of said elements to thereby connect the members with a series of columns corresponding to the selected elements, a common shaft for said members, means rotatably mounting the shaft for adjustment at will to jointly shift the members along the elements into co-action with the desired elements, indicating means comprising an index scale having an arcuate set of figures corresponding to the different orders of the aforesaid bank of control devices, and a column scale with an arcuate row of column figures, said index scale and column scale being shiftable relatively to each other by adjustment of said shaft to show by the correlation of the index scale figures with the column scale figures which columns are selected to control which control devices of said bank.

JOHN W. GALYON.